(12) United States Patent
Sugiura

(10) Patent No.: US 9,806,648 B2
(45) Date of Patent: Oct. 31, 2017

(54) MOTOR CONTROL DEVICE AND ELECTRIC POWER STEERING SYSTEM

(71) Applicant: JTEKT CORPORATION, Osaka-shi, Osaka (JP)

(72) Inventor: Shunsuke Sugiura, Kariya (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 15/093,333

(22) Filed: Apr. 7, 2016

(65) Prior Publication Data
US 2016/0308478 A1 Oct. 20, 2016

(30) Foreign Application Priority Data

Apr. 16, 2015 (JP) ................................ 2015-084383

(51) Int. Cl.
| | |
|---|---|
| *H02P 6/12* | (2006.01) |
| *B62D 5/04* | (2006.01) |
| *H02P 29/032* | (2016.01) |
| *H02P 6/14* | (2016.01) |
| *H02P 27/06* | (2006.01) |
| *H02H 7/122* | (2006.01) |
| *H02M 1/32* | (2007.01) |

(52) U.S. Cl.
CPC .............. *H02P 6/12* (2013.01); *B62D 5/0463* (2013.01); *B62D 5/0484* (2013.01); *B62D 5/0487* (2013.01); *H02P 6/14* (2013.01); *H02P 29/032* (2016.02); *H02H 7/1225* (2013.01); *H02M 2001/325* (2013.01); *H02P 27/06* (2013.01)

(58) Field of Classification Search
CPC ....................................................... H02P 6/12
USPC ............................ 318/400.21, 400.01, 700
See application file for complete search history.

(56) References Cited

U.S. PATENT DOCUMENTS

| | | | | |
|---|---|---|---|---|
| 6,005,366 | A * | 12/1999 | Majumdar ............ | H02M 7/538 318/801 |
| 7,791,293 | B2 * | 9/2010 | Nagase ................ | B62D 5/0487 318/400.01 |
| 8,499,885 | B1 * | 8/2013 | Satou ........................ | H02P 6/12 180/443 |
| 2014/0139158 | A1 | 5/2014 | Tomita et al. | |

(Continued)

FOREIGN PATENT DOCUMENTS

JP 2013-017304 A 1/2013

OTHER PUBLICATIONS

Sep. 6, 2016 Extended Search Report issued European Patent Application No. 16164927.2.

*Primary Examiner* — David S Luo
(74) *Attorney, Agent, or Firm* — Oliff PLC

(57) ABSTRACT

In a motor control device that can perform more appropriate motor control, a switching arm has a first upper FET, a second upper FET, and a lower FET connected in series to one another. A source electrode of the second upper FET and a drain electrode of the lower FET are connected to each other via an intermediate line. The intermediate line is connected to a U-phase motor coil of a motor via a power line. The first upper FET, the second upper FET, and the lower FET are each provided with a parasitic diode that prevents current from flowing from a battery side to a ground side. A phase opening relay FET is provided on the U-phase power line. A parasitic diode of the phase opening relay FET is provided such that a current is not applied from the U-phase motor coil to the U-phase switching arm.

5 Claims, 2 Drawing Sheets

(56) References Cited

U.S. PATENT DOCUMENTS

2016/0134212 A1 5/2016 Kikuchi et al.
2016/0173020 A1 6/2016 Kanekawa et al.

\* cited by examiner

MOTOR CONTROL DEVICE AND ELECTRIC POWER STEERING SYSTEM

INCORPORATION BY REFERENCE

The disclosure of Japanese Patent Application No. 2015-084383 filed on Apr. 16, 2015 including the specification, drawings and abstract, is incorporated herein by reference in its entirety.

BACKGROUND OF THE INVENTION

1. Field of the Invention

The present invention relates to a motor control device and an electric power steering system.

2. Description of Related Art

A conventional motor control device has a phase opening device that is disposed on a power line between a motor and an inverter circuit and is used to interrupt current. For example, Japanese Patent Application Publication No. 2013-17304 (JP 2013-17304 A) discloses a motor control device that controls a three-phase (U, V, and W phases) brushless motor that generates assist force. This motor control device controls electric power supplied to the three-phase brushless motor, and performs assist control that provides assist force. This motor control device has phase opening relays (FETs: field-effect transistors) that are disposed in respective three-phase power lines and prevent the flow of a current into the motor. In the event that a certain failure occurs, the motor control device opens these phase opening relays. With the three-phase power lines interrupted in this manner, the current flow into the motor is prevented.

When one of the three phase-opening-relay FETs has a short-circuit failure, the assist control can be continued with the remaining two phase-opening-relay FETs. However, the phase with the short-circuit failure causes current to flow through the motor coils to the other two phases, which deteriorates accuracy of the assist control performed by the remaining two phases. When one of the phase opening relays has a short-circuit failure and then the remaining two phase opening relays also fail due to short-circuits, or when an FET of the inverter circuit fails, the assist control has to be stopped to prevent current flow into the motor. Such a problem can occur, not only in the assist control but also in controlling the motor for the other purpose.

SUMMARY OF THE INVENTION

It is an object of the present invention to provide a motor control device that performs more appropriate motor control.

According to an aspect of the present invention, a motor control device includes:

an inverter circuit that has switching arms, the number of which is equal to the number of phases of a motor, and which are connected in parallel to one another, the switching arms each having a first upper switching element disposed on a positive electrode side of a power supply and a lower switching element disposed on a ground side of the power supply to supply electric power to the motor having a coil for each phase, the first upper switching element being connected to the lower switching element in series to each other;

a phase opening switching element provided on a power line of each phase, the power line connecting the coil of the phase and the switching arm of the phase; and a control circuit that controls switching of each switching element of the inverter circuit to control a supply of electric power to the coil for each phase, wherein the inverter circuit has, for each phase, a second upper switching element provided between a connection point and the first upper switching element of the switching arm, the connection point being a point at which the switching arm and the power line of the phase are connected to each other respectively;

the first upper switching element, the second upper switching element, and the lower switching element are each provided with a first diode connected in parallel thereto;

the first diode is provided such that a current don't flow though the first diode from a power supply side to the ground side;

the phase opening switching element is provided with a second diode connected in parallel thereto; and the second diode is provided such that a current does not flow though the second diode from the motor to the inverter circuit.

According to this configuration, switching elements of the inverter circuit each having a diode that is opposed to a diode of each of phase opening switching elements on a power supply line are made redundant. Accordingly, a supply of electric power to the motor can be continued even when any one of the switching elements has a failure, or even when any one of the phase opening switching elements has a failure. For example, when any one of the first upper switching elements has a failure, the second upper switching element, the lower switching element, and the phase opening switching element of a phase with the failure are turned off to prevent a fault current from flowing from the switching arm of the phase with the failure to the coil of the phase. Even when any one of the phase opening switching elements has a failure, or even when any one of the lower switching elements has a failure, a supply of electric power to the motor can be more appropriately continued.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
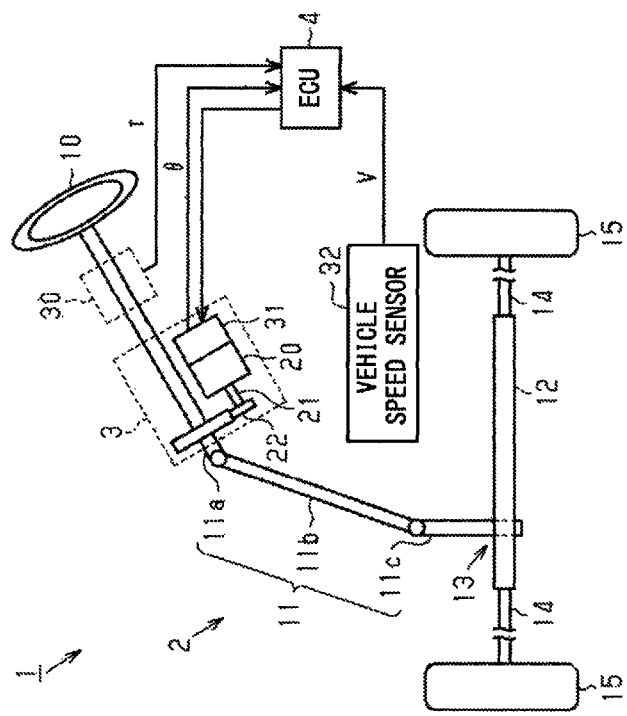
FIG. 1 is a diagram schematically showing the configuration of an electric power steering system to which a motor control device of the present embodiment is applied.

An electric power steering system (hereinafter abbreviated as EPS) to which a motor control device of an embodiment of the present invention is applied will be described. As shown in FIG. 1, an EPS 1 includes a steering mechanism 2 that steers steered wheels 15 based on operation of a steering wheel 10 by a driver, an assist mechanism 3 that assists the steering operation of the driver, and an electronic control unit (ECU) 4 that serves as the motor control device that controls the assist mechanism 3.

The steering mechanism 2 includes the steering wheel 10 and a steering shaft 11 which rotate together with the steering wheel 10. The steering shaft 11 has a column shaft 11a coupled to the steering wheel 10, an intermediate shaft 11b coupled to a lower end portion of the column shaft 11a, and a pinion shaft 11c coupled to a lower end portion of the intermediate shaft 11b. A lower end portion of the pinion shaft 11c is coupled to a rack shaft 12. In the steering mechanism 2, therefore, a rotary motion of the steering shaft 11 is converted into a linear reciprocating motion in an axial direction of the rack shaft 12 (i.e. left and right direction in FIG. 1), via a rack-and-pinion mechanism 13 including a pinion gear provided at a distal end of the pinion shaft 11c and a rack formed in the rack shaft 12. The linear reciprocating motion is transferred to the left and right steered wheels 15 via tie rods 14 coupled to both ends of the rack shaft 12, and thus the steered angle of the steered wheels 15 is changed.

The assist mechanism 3 includes a motor 20 that generates an assist force. A rotating shaft 21 of the motor 20 is coupled to the column shaft 11a via a speed reducer 22. The speed reducer 22 reduces rotational speed of the motor 20 and transfers the rotation with a reduced speed to the column shaft 11a. That is, the rotation (torque) of the motor 20 is provided to the steering shaft 11 as an assist force, and thus the steering operation of the driver is assisted. The motor 20 used is a three-phase brushless motor that rotates with three-phase (U, V, and W) driving power.

The ECU 4 controls the motor 20 based on detection result of a variety of sensors installed in the vehicle. Examples of the variety of sensors include a torque sensor 30, a rotation angle sensor 31, and a vehicle speed sensor 32. The torque sensor 30 is installed on the column shaft 11a, and the rotation angle sensor 31 is installed on the motor 20. The torque sensor 30 detects a steering torque τ that is given to the steering shaft 11 in accordance with the steering operation of the driver. The rotation angle sensor 31 detects a rotation angle θ of the rotating shaft 21. The vehicle speed sensor 32 detects a vehicle speed V at which the vehicle is traveling. The ECU 4 sets a target assist force based on outputs from the sensors (steering torque τ, rotation angle θ, and vehicle speed V), and controls current supplied to the motor 20 so that an actual assist force becomes equal to the target assist force.

Figure 2:
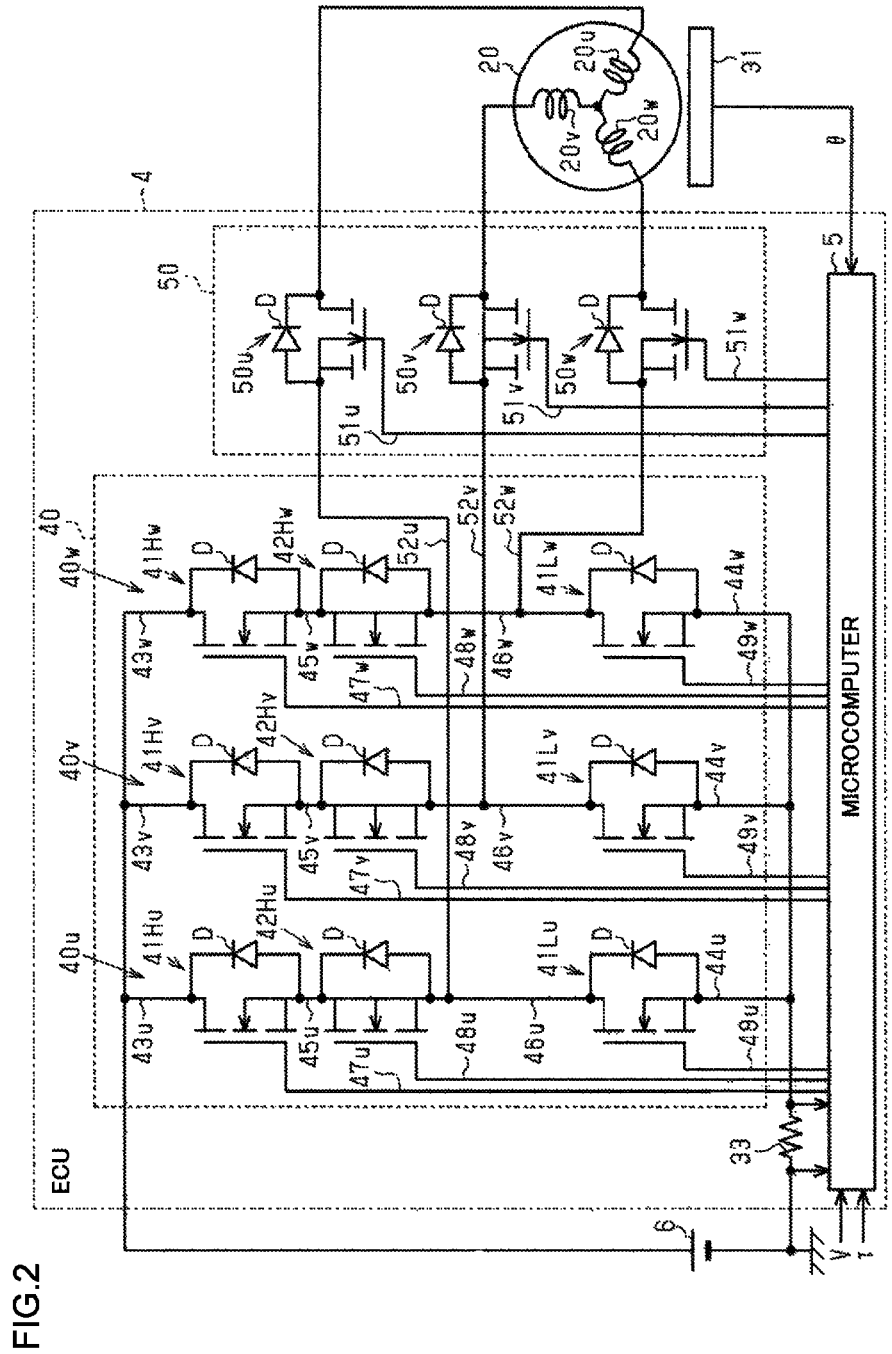
FIG. 2 is a block diagram schematically showing the configuration of the motor control device of the present embodiment.

Next, the ECU 4 will be described in detail. As shown in FIG. 2, the ECU 4 includes an inverter circuit 40 that supplies three-phase AC power to the motor 20, a group of phase opening relays 50 that interrupts power supply lines to the motor 20 under abnormal conditions, and a microcomputer 5 that controls operations of the inverter circuit 40 and the group of phase opening relays 50.

The inverter circuit 40 has three switching arms 40u, 40v, and 40w connected in parallel to one another. The switching arm 40u has a first upper FET 41Hu, a second upper FET 42Hu, and a lower FET 41Lu connected in series to one another. The switching arm 40v has a first upper FET 41Hv, a second upper FET 42Hv, and a lower FET 41Lv connected in series to one another. The switching arm 40w has a first upper FET 41Hw, a second upper FET 42Hw, and a lower FET 41Lw connected in series to one another. The first upper FETs (field-effect transistors) 41Hu, 41Hv, 41Hw, and the second upper FETs 42Hu, 42Hv, 42Hw are connected to a positive electrode side of a battery 6 that serves as a power supply; the lower FETs 41Lu, 41Lv, 41Lw are connected to a ground side of the battery 6. The FETs used are MOS-FETs (metal oxide semiconductor field-effect transistors).

Drain electrodes of the first upper FETs 41Hu, 41Hv, 41Hw are respectively connected to the battery 6 via drain lines 43u, 43v, 43w. Source electrodes of the lower FETs 41Lu, 41Lv, 41Lw are respectively connected to the ground side via source lines 44u, 44v, 44w. Source electrodes of the first upper FETs 41Hu, 41Hv, 41Hw are respectively connected to drain electrodes of the second upper FETs 42Hu, 42Hv, 42Hw via intermediate lines 45u, 45v, 45w. Source electrodes of the second upper FETs 42Hu, 42Hv, 42Hw are respectively connected to drain electrodes of the lower FETs 41Lu, 41Lv, 41Lw via intermediate lines 46u, 46v, 46w. The intermediate lines 46u, 46v, 46w are respectively connected to motor coils 20u, 20v, 20w of respective phases of the motor 20, via power lines 52u, 52v, 52w. Gate electrodes of the first upper FETs 41Hu, 41Hv, 41Hw are respectively connected to the microcomputer 5 via gate lines 47u, 47v, 47w. Gate electrodes of the second upper FETs 42Hu, 42Hv, 42Hw are respectively connected to the microcomputer 5 via gate lines 48u, 48v, 48w. Gate electrodes of the lower FETs 41Lu, 41Lv, 41Lw are respectively connected to the microcomputer 5 via gate lines 49u, 49v, 49w. The first upper FETs 41Hu, 41Hv, 41Hw, the second upper FETs 42Hu, 42Hv, 42Hw, and the lower FETs 41Lu, 41Lv, 41Lw are each provided with a parasitic diode D that allows current to flow from a source electrode side to a drain electrode side. That is, the first upper FETs 41Hu, 41Hv, 41Hw, the second upper FETs 42Hu, 42Hv, 42Hw, and the lower FETs 41Lu, 41Lv, 41Lw are each provided with the parasitic diode D that prevents current from flowing from a battery 6 side to the ground side.

The group of phase opening relays 50 is provided on the power lines 52u, 52v, and 52w connecting the motor 20 and the inverter circuit 40. That is, a phase opening relay FET 50u as a phase opening device that interrupts a motor current applied through the power line 52u is provided in the U-phase power line 52u; similarly, a phase opening relay FET 50v is provided on the V-phase power line 52v and a phase opening relay FET 50w is provided on the W-phase power line 52w. Gate electrodes of the phase opening relay FETs 50u, 50v, 50w are respectively connected to the microcomputer 5 via gate lines 51u, 51v, 51w. Parasitic diodes D of the phase opening relay FETs 50u, 50v, 50w are provided such that currents don't flow though the parasitic diodes D from the motor coils 20u, 20v, 20w to the switching arms 40u, 40v, 40w of the respective phases.

A current sensor 33 is provided between the switching arms 40u, 40v, 40w and ground to detect a current actually provided to the motor 20. The current sensor 33 used is a shunt resistor. A value of the actual current applied to the phases of the motor 20 can be measured by detecting a voltage across the shunt resistor.

The microcomputer 5 generates a control signal (voltage signal) based on the steering torque τ, the rotation angle θ, the vehicle speed V, and the current value detected through the current sensor 33. The control signal is applied to the gate electrodes of the first upper FETs 41Hu, 41Hv, 41Hw, the second upper FETs 42Hu, 42Hv, 42Hw, and the lower FETs 41Lu, 41Lv, 41Lw. The first upper FETs 41Hu, 41Hv, 41Hw, the second upper FETs 42Hu, 42Hv, 42Hw, and the lower FETs 41Lu, 41Lv, 41Lw are turned on or off, depending on the control signal.

The microcomputer 5 is connected to gate terminals of the phase opening relay FETs 50u, 50v, 50w. The phase opening relay FETs 50u, 50v, 50w are turned on or off, depending on the control signal generated by the microcomputer 5.

The microcomputer 5 can detect a failure, such as a short circuit, of an FET of the inverter circuit 40, in a known manner. The microcomputer 5 turns off (opens) one of the phase opening relays FETS 50u, 50v, 50w that corresponds to the FET with the failure. This allows interruption of current (fault current) into one of the power lines 52u, 52v, 52w that corresponds to the phase with the failure.

Next, the operation in a case where any one of the first upper FETs 41Hu, 41Hv, 41Hw and the second upper FETs 42Hu, 42Hv, 42Hw is short-circuited will be described. First, a short circuit of the first upper FET 41Hu is assumed.

In this case, the second upper FET 42Hu, the lower FET 41Lu, and the phase opening relay FET 50u are turned off to prevent a fault current from flowing into the U-phase motor coil 20u. To be specific, since the parasitic diode D of the second upper FET 42Hu is provided such that a current don't flow though the parasitic diodes D from the battery 6 side to the ground side, it is possible to prevent a fault current from flowing from the battery 6 to the U-phase motor coil 20u. Furthermore, since the parasitic diode D of the phase opening relay FET 50u is provided such that a current don't flow though the parasitic diodes D from the motor coil 20u to the U-phase switching arm 40u, it is possible to prevent the fault current from flowing from the U-phase motor coil 20u to the U-phase switching arm 40u. In addition, since the parasitic diode D of the lower FET 41Lu is provided such that a current don't flow though the parasitic diodes D from the battery 6 side to the ground side, it is possible to prevent the fault current from flowing from the motor coil 20u to the ground side.

Since a supply of electric power to the motor coils 20v and 20w of the V-phase and the W-phase other than the U-phase with the short-circuit failure is continued, the assist control can be continued without deteriorating accuracy of the assist control.

In a case where the second upper FET 42Hu is short-circuited, the assist control is similarly performed as in the case where the first upper FET 41Hu is short-circuited. That is, when the second upper FET 42Hu is short-circuited, the first upper FET 41Hu, the lower FET 41Lu, and the phase opening relay FET 50u are turned off to continue the assist control. The assist control can also be continued even when any one of the other phases' first upper FETs 41Hv, 41Hw and second upper FETs 42Hv, 42Hw is short-circuited, by performing a similar operation.

In this manner, even when any one of the first upper FETs 41Hu, 41Hv, 41Hw and the second upper FETs 42Hu, 42Hv, 42Hw is short-circuited, it is possible to prevent current from flowing from the phase with a short-circuit failure to the remaining two phases, by turning off FETs of the phase with the short-circuit failure. This can more appropriately perform the assist control with the remaining two phases.

In this connection, there may be a configuration in which only either of the first upper FETs (41Hu, 41Hv, 41Hw) and the second upper FETs (41Hu, 41Hv, 41Hw) are provided. In this configuration, however, an unexpected current may flow into the motor 20.

To be specific, a case where the second upper FETs 42Hu, 42Hv, 42Hw are not provided is assumed. In this case, when the U-phase first upper FET 41Hu is short-circuited for example, it is not possible to prevent a fault current from flowing into the U-phase motor coil 20u even when the lower FET 41Lu and the phase opening relay FET 50u are turned off. The fault current having flown into the U-phase motor coil 20u flows through the V-phase and the W-phase power lines 52v, 52w in an opposite direction, via the V-phase and the W-phase motor coils 20v, 20w. In this case, if the assist control is continued with the remaining two phases other than the phase with a short-circuit failure (so-called "two-phase driving"), currents flowing in the remaining two phases may be affected by the current flowing in the opposite direction. This may result in low accuracy of the assist control.

Next, a case where any one of the lower FETs 41Lu, 41Lv, and 41Lw is short-circuited will be briefly described. As an example, a case where the lower FET 41Lu is short-circuited is assumed. In this case, the first upper FET 41Hu, the second upper FET 42Hu, and the phase opening relay FET 50u are turned off to prevent a fault current from flowing into the U-phase motor coil 20u. Since a supply of electric power to the motor coils 20v and 20w of the V-phase and the W-phase other than the U-phase with the short-circuit failure is continued, the assist control can be continued without deteriorating accuracy of the assist control. In a case where any one of the lower FETs 41Lv and 41Lw is short-circuited, the assist control is similarly performed.

Next, a case where any one of the phase opening relay FETs 50u, 50v, and 50w is short-circuited will be briefly described. As an example, a case where the phase opening relay FET 50u is short-circuited is assumed. In this case, the first upper FET 41Hu, the second upper FET 42Hu, and the lower FET 41Lu are turned off to prevent a fault current from flowing into the U-phase motor coil 20u. Since a supply of electric power to the motor coils 20v and 20w of the V-phase and the W-phase other than the U-phase with the short-circuit failure is continued, the assist control can be continued without deteriorating accuracy of the assist control. In a case where any one of the phase opening relay FETs 50v and 50w is short-circuited, the assist control is similarly performed.

Effects of the present embodiment will be described below. (1) The upper FETs of the inverter circuit 40 are made redundant. That is, the inverter circuit 40 is provided with the first upper FETs 41Hu, 41Hv, 41Hw and the second upper FETs 42Hu, 42Hv, 42Hw. With this configuration, even when any one of the first upper FETs 41Hu, 41Hv, 41Hw and the second upper FETs 42Hu, 42Hv, 42Hw is short-circuited, a fault current can be more appropriately prevented from flowing into motor coils of normal phases. Accordingly, the assist control can be more appropriately continued with remaining two phases other than the phase with a short-circuit failure. Furthermore, the configuration allows the assist control to be continued with the remaining two phases in more failure cases.

(2) Each power supply line is provided with an FET having a parasitic diode D and another FET having another parasitic diode D so that these diodes are facing in opposite directions to each other on each power supply line. Accordingly, the assist control can be more appropriately continued even when any one of the lower FETs 41Lu, 41Lv, 41Lw is short-circuited, or even when any one of the phase opening relay FETs 50u, 50v, 50w is short-circuited.

The present embodiment may be modified as below. In the present embodiment, when the first upper FET 41Hu is short-circuited for example, the second upper FET 42Hu, the lower FET 41Lu, and the phase opening relay FET 50u are turned off. However, the present invention is not limited to this. For example, when it is determined that the first upper FET 41Hu is short-circuited, only the second upper FET 42Hu may be turned off. Alternatively, when it is determined that a certain FET is short-circuited in a phase, all FETs in the phase other than the short-circuited FET may be turned off.

A phase with a short-circuit failure may be detected and FETs of the detected phase may be turned on or off, based on a single control signal. To be specific, gate electrodes of the first upper FET 41Hu, the second upper FET 42Hu, the lower FET 41Lu, and the phase opening relay FET 50u may be further connected to a common gate line. This gate line may be selected in place of the normal gate lines when a short-circuit failure is detected in the U-phase. Upon the detection of the short-circuit failure of the U-phase, the microcomputer 5 generates a single control signal and sends the signal to the U-phase FETs via the additional common gate line, and then the U-phase FETs are turned off. Alternatively, by detecting an FET with a short-circuit failure in a phase, FETs of the phase may be turned on or off, based on a single control signal.

In the present embodiment, only the upper FETs are made redundant, but the lower FETs may also be made redundant. In the present embodiment, the motor 20 used is a three-phase motor, but the present invention is not limited to this. For example, the motor 20 may be a 12-phase motor. That is, the motor 20 may be any motor as long as it has multiple phases.

In the present embodiment, the single inverter circuit 40 is provided to supply three-phase AC power to the motor 20, but the present invention is not limited to this. For example, two inverter circuits 40 may be provided for the motor 20, and thus the inverter circuits 40 may be made redundant.

The microcomputer 5 may be provided, in the interior thereof, with ground of the switching arms 40*u*, 40*v*, 40*w* of respective phases. In the present embodiment, one shunt resistor is used as an example of the current sensor 33, but the present invention is not limited to this. For example, the switching arms 40*u*, 40*v*, 40*w* may be each provided with a corresponding current sensor. The current sensor 33 is not limited to a current detector using a shunt resistor, and may be any current detector.

In the present embodiment, the switching elements used are FETs (in particular, MOS-FETs), but the present invention is not limited to this. For example, the switching elements including parasitic diodes may be junction FETs. Alternatively, the switching elements used may be IGBTs (insulated-gate bipolar transistors). When IGBTs are used as the switching elements, the IGBTs may be provided with diodes that serve as the parasitic diodes D.

The present embodiment can be applied not only to a short-circuit failure of each FET, but also to an open-circuit failure of the same. Even when an open-circuit failure occurs in a certain phase, the assist control is continued by turning off FETs of the certain phase with the open-circuit failure, and by using the remaining two phases other than the phase with the open-circuit failure.

In the present embodiment, the motor control device has been embodied in the ECU 4 of the EPS 1, but the motor control device may be used in different applications other than EPS 1. For example, the motor control device may be applied to a steer-by-wire system.

What is claimed is:

1. A motor control device comprising:
   an inverter circuit that has switching arms, the number of which is equal to the number of phases of a motor, and which are connected in parallel to one another, the switching arms each having a first upper switching element disposed on a positive electrode side of a power supply and a lower switching element disposed on a ground side of the power supply to supply electric power to the motor having a coil for each phase, the first upper switching element and the lower switching element being connected to each other in series;
   a phase opening switching element provided on a power line of each phase, the power line connecting the coil of the phase and the switching arm of the phase; and
   a control circuit that controls switching of each switching element of the inverter circuit to control a supply of electric power to the coil for each phase, wherein
   the inverter circuit has, for each phase, a second upper switching element provided between a connection point and the first upper switching element of the switching arm, the connection point being a point at which the switching arm and the power line of the phase are connected to each other respectively, the second upper switching element being connected in series with the first upper switching element and the lower switching element;
   the first upper switching element, the second upper switching element, and the lower switching element are each provided with a first diode connected in parallel thereto;
   the first diode is provided such that current does not flow through the first diode from a power supply side to the ground side;
   the phase opening switching element is provided with a second diode connected in parallel thereto; and
   the second diode is provided such that current does not flow through the second diode from the motor to the inverter circuit.

2. The motor control device according to claim 1, wherein,
   the motor has coils for at least three phases; and
   when any one of the switching elements of the inverter circuit and the phase opening switching element has a failure, the control circuit turns off all of the first upper switching element, the second upper switching element, the lower switching element, and the phase opening switching element of a phase with the failure, and continues controlling the motor by using the remaining normal phases other than the phase with the failure.

3. The motor control device according to claim 2, wherein,
   the phase opening switching element is a MOS-FET (metal oxide semiconductor field-effect transistor); and
   the diode of the phase opening switching element is a parasitic diode in the MOS-FET.

4. The motor control device according to claim 1, wherein,
   the phase opening switching element is a MOS-FET (metal oxide semiconductor field-effect transistor); and
   the diode of the phase opening switching element is a parasitic diode in the MOS-FET.

5. An electric power steering system, comprising the motor control device as claimed in claim 1.

* * * * *